(12) United States Patent
Massie et al.

(10) Patent No.: US 12,006,059 B2
(45) Date of Patent: Jun. 11, 2024

(54) CATALYTIC INERTING SYSTEM WITH FUEL VAPOR ENRICHMENT

(71) Applicant: Parker-Hannifin Corporation, Cleveland, OH (US)

(72) Inventors: Daniel Massie, Mission Viejo, CA (US); Bryan Jensen, Mission Viejo, CA (US); Daniel Henninger, Irvine, CA (US); Scott Auld-Hill, Orange, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 607 days.

(21) Appl. No.: 17/280,276

(22) PCT Filed: Nov. 4, 2019

(86) PCT No.: PCT/US2019/059646
§ 371 (c)(1),
(2) Date: Mar. 26, 2021

(87) PCT Pub. No.: WO2020/096954
PCT Pub. Date: May 14, 2020

(65) Prior Publication Data
US 2022/0033099 A1    Feb. 3, 2022

Related U.S. Application Data

(60) Provisional application No. 62/875,010, filed on Jul. 17, 2019, provisional application No. 62/756,756, filed on Nov. 7, 2018.

(51) Int. Cl.
*B64D 37/32* (2006.01)
*A62C 3/06* (2006.01)
(Continued)

(52) U.S. Cl.
CPC .............. *B64D 37/32* (2013.01); *A62C 3/065* (2013.01); *A62C 3/08* (2013.01); *B01J 19/14* (2013.01)

(58) Field of Classification Search
None
See application file for complete search history.

(56) References Cited

U.S. PATENT DOCUMENTS 7,459,081 B2   12/2008   Koenig et al.
7,628,965 B2   12/2009   Johnson et al.
(Continued)

FOREIGN PATENT DOCUMENTS

| WO | 02/28714 | 4/2002 |
|---|---|---|
| WO | 2007/008730 | 1/2007 |
| WO | 2017/127478 | 7/2017 |

OTHER PUBLICATIONS

Written Opinion issued by WIPO for corresponding International Patent Application No. PCT/US2019/059646 mailed on Nov. 13, 2020.

(Continued)

*Primary Examiner* — Jennifer A Leung
(74) *Attorney, Agent, or Firm* — Renner, Otto, Boisselle & Sklar, LLP

(57) ABSTRACT

An inerting system for a fuel tank containing a liquid fuel and an ullage gas. The inerting system includes a fluid circuit connectable to the fuel tank, an evaporator connected in the circuit, and a reactor connected in the circuit downstream of the evaporator. The evaporator receives a flow of the liquid fuel from the fuel tank and volatilizes at least a portion of the liquid fuel to thereby form a volatilized fuel vapor. The evaporator also receives a flow of the ullage gas from the fuel tank, and permits the ullage gas to sweep away the volatilized fuel vapor downstream with the ullage gas to thereby form a fuel enriched gas mixture containing the (Continued)

ullage gas and the volatilized fuel vapor. The reactor converts at least some of the fuel enriched gas mixture into a non-flammable gas. The circuit supplies at least some of the non-flammable gas to the fuel tank.

17 Claims, 11 Drawing Sheets

(51) Int. Cl.
*A62C 3/08* (2006.01)
*B01J 19/14* (2006.01)

(56) References Cited

U.S. PATENT DOCUMENTS

| | | |
|---|---|---|
| 7,694,916 B2 | 4/2010 | Limaye et al. |
| 7,735,670 B2 | 6/2010 | Zaki et al. |
| 7,896,292 B2 | 3/2011 | Limaye et al. |
| 7,905,259 B2 | 3/2011 | Johnson et al. |
| 9,144,768 B2 | 9/2015 | Tichborne et al. |
| 9,687,773 B2 | 6/2017 | Johnson et al. |
| 2009/0266342 A1* | 10/2009 | Morales ............... F02M 31/186 123/543 |
| 2018/0037334 A1 | 2/2018 | Surawski et al. |
| 2018/0148191 A1 | 4/2018 | Smith et al. |
| 2018/0018189 A1 | 5/2018 | Surawski et al. |
| 2018/0148188 A1 | 5/2018 | Surawski et al. |
| 2018/0148190 A1 | 5/2018 | Smith et al. |
| 2018/0155047 A1 | 6/2018 | Surawski et al. |
| 2018/0155048 A1 | 6/2018 | Surawski et al. |
| 2018/0155049 A1 | 6/2018 | Smith et al. |
| 2018/0155050 A1 | 6/2018 | Surawski et al. |
| 2018/0222598 A1 | 8/2018 | Surawski et al. |

OTHER PUBLICATIONS

Written Opinion issued by WIPO for corresponding International Patent Application No. PCT/US2019/059646 mailed on Feb. 2, 2021.

International Search Report and Written Opinion issued by WIPO for corresponding International Patent Application No. PCT/US2019/059646 mailed on Feb. 25, 2020.

Rousseau et al., "Aircraft Fuel Tank Inerting by Catalytic Fuel Combustion," Downloaded from SAE International on Nov. 18, 2015.

Manatt, Scott A., "Feasibility Study And Demonstration Of Nitrogen Generation For Fuel Tank Inerting," FAA Report, Jun. 1972.

McDonald et al., "Catalytic Reactor For Inerting Of Aircraft Fuel Tanks," Air Force Report, Jun. 1972.

Warner et al., "A Fuel Tank Inerting System For Military Aircraft," Air Force Report, Feb. 1971.

Hamilton, MacKenzie L., "Aircraft Fuel Tank Inerting Program," Air Force Report, Jan. 1971.

Wainright, et al., "Generation Of Inerting Gases For Aircraft Fuel Tanks By Catalytic Combustion Techniques," Air Force Report, Aug. 1969.

"Second Conference on Fuel System Fire Safety," FAA Report of Conference, May 1970.

* cited by examiner

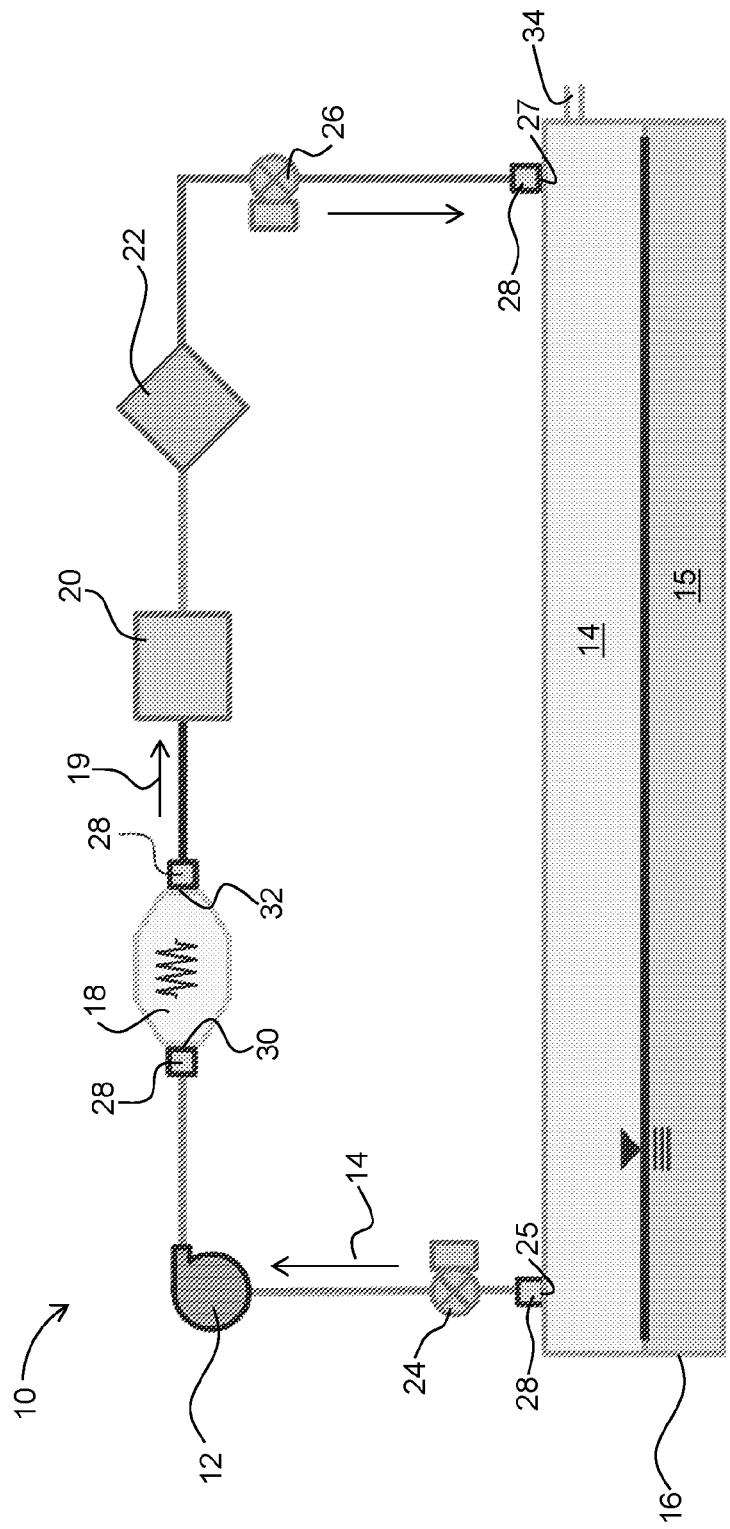
FIG. 1
(CONVENTIONAL)

CATALYTIC INERTING SYSTEM WITH FUEL VAPOR ENRICHMENT

RELATED APPLICATIONS

This application is a national phase of International Patent Application No. PCT/US2019/059646 filed on Nov. 4, 2019, which claims the benefit of both U.S. Provisional Application No. 62/875,010 filed Jul. 17, 2019 and U.S. Provisional Application No. 62/756,756 filed Nov. 7, 2018, all of which are hereby incorporated herein by reference in their entireties.

TECHNICAL FIELD

The present disclosure relates generally to inerting systems, and more particularly to catalytic inerting system (CIS) architecture for fuel tanks.

BACKGROUND

The basic ullage-recirculating CIS architecture generally requires that ullage gas (the air and fuel vapor mixture that exists over the top of the liquid fuel in a fuel tank) be drawn from the fuel tank and reacted in a catalytic reactor. The catalytic process causes the flammable components present in the ullage gas (i.e., oxygen and fuel vapor) to chemically react and produce relatively inert, non-flammable chemical species, namely carbon dioxide ($CO_2$) and water vapor. Nitrogen, which typically is the component present in the greatest amount in the ullage gas, is an inert species and does not participate in the fuel vapor and air reaction that occurs in the catalytic reactor. The byproducts of the catalytic reaction and the nitrogen are all inert (non-flammable) and can be returned to the fuel tank to create an inert environment in the ullage. Because water is undesirable in the fuel tank, the water typically is removed from the inert gas stream before it is returned to the fuel tank.

Although the ullage space in the fuel tank will almost always contain fuel vapor in some concentration, this amount is typically below the so-called lower flammability limit (LFL) for tanks containing jet fuel or diesel fuel, and above the upper flammability limit (UFL) for fuel tanks containing gasoline. When the fuel vapor concentration in the ullage space is below the LFL, an insufficient quantity of fuel vapor exists in the ullage space to sustain a fire. When the fuel vapor concentration is above the UFL, the amount of fuel vapor present in the ullage is too great to sustain a fire. Fuels developed for automotive and aircraft applications are typically outside the so-called flammability window defined by the LFL and the UFL.

SUMMARY

The inerting performance of an inerting system is strongly related to the amount of fuel vapor introduced into the reactor for conversion to non-flammable species (e.g., carbon dioxide and water). For example, if the fuel vapor composition is described by the hydrocarbon molecule $C_9H_{15}$, then the reaction equation is:

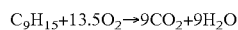

Assuming the reaction is limited by the quantity of fuel vapor molecules, then increasing the number of moles of fuel vapor introduced into the reactor will increase the number of moles of oxygen consumed, and thus increase the production of carbon dioxide and water. Ideally, the reactor would be provided with the maximum amount of fuel vapor while also staying just below the LFL during operation, thereby enabling the reactor to convert the maximum amount of available oxygen into the non-flammable inert byproducts. However, the fuel vapor content in the ullage gas (and therefore that which is introduced into the reactor) strongly depends on the temperature and pressure conditions, such as during flight, and may therefore vary significantly, thus degrading the inerting performance of the system. Accordingly, there is a need in the art to provide an inerting system that can supplement and/or control the fuel vapor content of the reactor's feed gas stream, such as when the ullage fuel vapor content decreases significantly, which may occur during low temperature and/or high pressure conditions.

An aspect of the present disclosure provides an inerting system that improves upon the inerting performance of conventional ullage-recirculating inerting systems.

More particularly, according to an aspect of the present disclosure, the inerting system described herein supplements the ullage gas with a quantity of fuel vapor for introduction of this enriched gas mixture into the reactor, thus enhancing the conversion of flammable species to non-flammable species during the reaction process. The resulting mixture of ullage gas and fuel vapor is controlled to enrich the fuel vapor content of this reaction gas, such as slightly below the LFL, therefore making it inherently non-flammable. To achieve this, a quantity of liquid fuel is introduced into an evaporator that volatilizes at least a portion of the liquid fuel to form the supplemental fuel vapor. The evaporator also receives a flow of the ullage gas, which sweeps away the volatilized fuel vapors downstream toward the reactor for conversion of this enriched mixture of ullage gas and volatilized fuel vapor. Any unevaporated liquid fuel may be allowed to return to the fuel tank. The amount of fuel vapor introduced into the reactor may be controlled during an entire flight profile to account for temperature and/or pressure (i.e., altitude) changes. For example, the evaporator may be heated in a controlled manner to control the amount of fuel vapor in the enriched feed gas stream. Alternatively or additionally, the amount of liquid fuel introduced into the evaporator may be controlled. Such a system may mitigate inerting performance issues inherent in conventional ullage recirculating catalytic inerting systems, such as during low fuel temperature conditions, or the like.

According to an aspect of the present disclosure, an inerting system for a fuel tank containing a liquid fuel and an ullage gas, includes: a fluid circuit fluidly connectable to the fuel tank; an evaporator connected in the fluid circuit, the evaporator being configured to receive a flow of the liquid fuel from the fuel tank and volatilize at least a portion of the liquid fuel to thereby form a volatilized fuel vapor, and wherein the evaporator is configured to receive a flow of the ullage gas from the fuel tank, and is configured to permit the ullage gas to sweep away the volatilized fuel vapor downstream with the ullage gas to thereby form a fuel-enriched gas mixture containing the ullage gas and the volatilized fuel vapor; and a reactor connected in the fluid circuit downstream of the evaporator, the reactor being configured to convert at least a portion of the fuel-enriched gas mixture into a non-flammable gas; and wherein the fluid circuit is configured to supply at least a portion of the non-flammable gas to the fuel tank.

According to another aspect of the present disclosure, a method of operating an inerting system, includes: pumping a liquid fuel from a fuel tank to an evaporator; using the evaporator to volatilize at least one portion of the liquid fuel to form a fuel vapor; supplying an ullage gas from the fuel tank to the evaporator; using the ullage gas to sweep away the fuel vapor in the evaporator to form a fuel-enriched gas mixture containing the ullage gas and the fuel vapor; using a reactor to convert at least a portion of the fuel-enriched gas mixture to a non-flammable gas; and passing the non-flammable gas to the fuel tank.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects according to the present disclosure.

FIG. 1 is a schematic diagram of a conventional ullage-recirculating catalytic inerting system.

DETAILED DESCRIPTION

Figure 2:
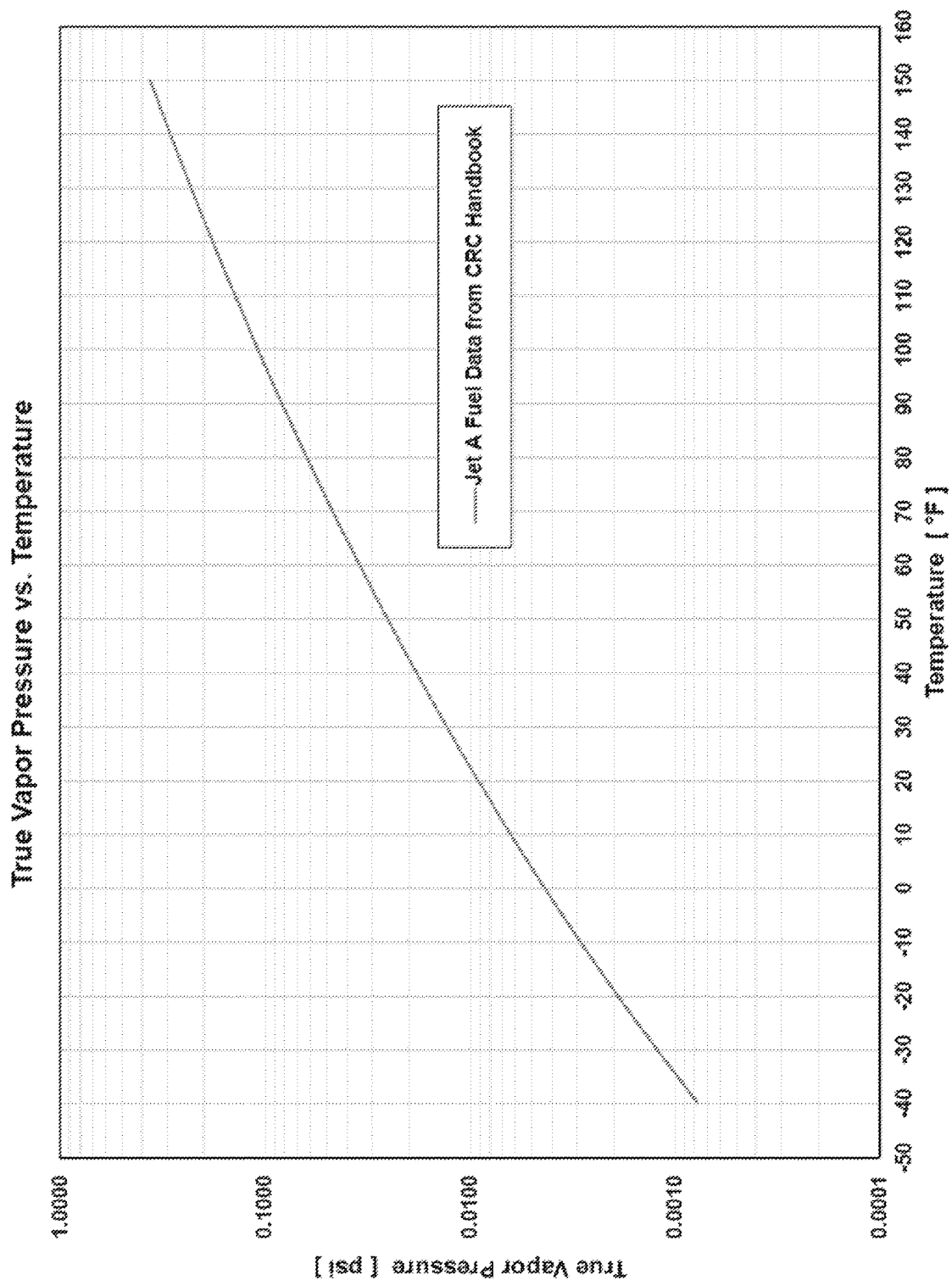
FIG. 2 is a chart plotting the true vapor pressure versus temperature for Jet A fuel.

The principles and aspects according to the present disclosure have particular application to ullage-recirculating catalytic inerting systems (CIS) for fuel tanks, and thus will be described below chiefly in this context. It is understood, however, that principles and aspects according to the present disclosure may be applicable to other inerting systems generally, and may be applicable to a wide variety of applications, such as aerospace, automotive, industrial applications, and the like.

Referring to FIG. 1, an example of a conventional ullage-recirculating catalytic inerting system (CIS) 10 is shown. The conventional CIS 10 includes a closed-loop circuit that utilizes a blower 12 to draw ullage gas 14 from a fuel tank 16 into a catalytic reactor 18. The ullage gas 14 includes an air and fuel vapor mixture that exists over the top of the liquid fuel 15 in the fuel tank 16. The catalytic reactor 18 uses a catalytic reaction process that causes the flammable components present in the ullage gas 14 (i.e., oxygen and fuel vapor) to chemically react and produce relatively inert, non-flammable chemical species, namely carbon dioxide ($CO_2$) and water vapor. The ullage gas 14 also contains nitrogen, which typically is the component present in the greatest amount in the ullage gas 14. The nitrogen is inert and does not participate in the fuel vapor and air reaction that occurs in the catalytic reactor 18. The gaseous byproducts of the catalytic reaction and the nitrogen are all inert (non-flammable) and are then returned to the fuel tank 16 to create an inert environment in the ullage. An example of such a conventional CIS 10 is disclosed in U.S. Pat. No. 7,694,916, the contents of which are incorporated herein by reference.

As shown in FIG. 1, the conventional CIS 10 typically includes a heat exchanger 20 that is used to cool the inert (non-flammable) gas 19 exiting the reactor 18, and may include a condenser 22 that is used to condense at least some components of the gas 19, such as the water vapor, for facilitating removal thereof before the non-flammable gas 19 is returned to the fuel tank 16. An isolation valve 24 may be connected to a fluid line downstream of an outlet 25 of the fuel tank 16 to prevent flow of the ullage gas 14 into the CIS 10, and another isolation valve 26 may be connected to a fluid line upstream of an inlet 27 of the fuel tank 16 to prevent flow from the CIS 10 to the fuel tank 16. One or more flame arresters 28 also may be provided at various locations of the circuit, such as at an inlet 30 and outlet 32 of the reactor 18, and/or at the outlet 25 and inlet 27 of the fuel tank 16. An ambient vent 34 may be provided in the fuel tank 16 to equilibrate pressure when exposed to super-atmospheric or sub-atmospheric conditions.

As discussed above, one problem with conventional catalytic inerting systems, such as the CIS 10 shown in FIG. 1, is that the fuel vapor content in the ullage gas 14 (and therefore that which is introduced into the reactor 18) depends on the temperature and pressure conditions, and therefore may vary significantly such as during flight. For example, the chart in FIG. 2 shows how a jet fuel's true vapor pressure varies with fuel temperature. In some cases, the quantity of fuel vapor (as determined by its vapor pressure) can vary by more than a factor of 10 across normal operating temperatures. Accordingly, because the reaction in the catalytic reactor 18 is strongly related to the amount of fuel vapor molecules contained in the ullage reaction gas 14, the inerting performance of the CIS 10 will be negatively affected when the vapor pressure of the ullage gas stream 14 decreases, such as in low temperature and/or high pressure conditions.

Figure 3:
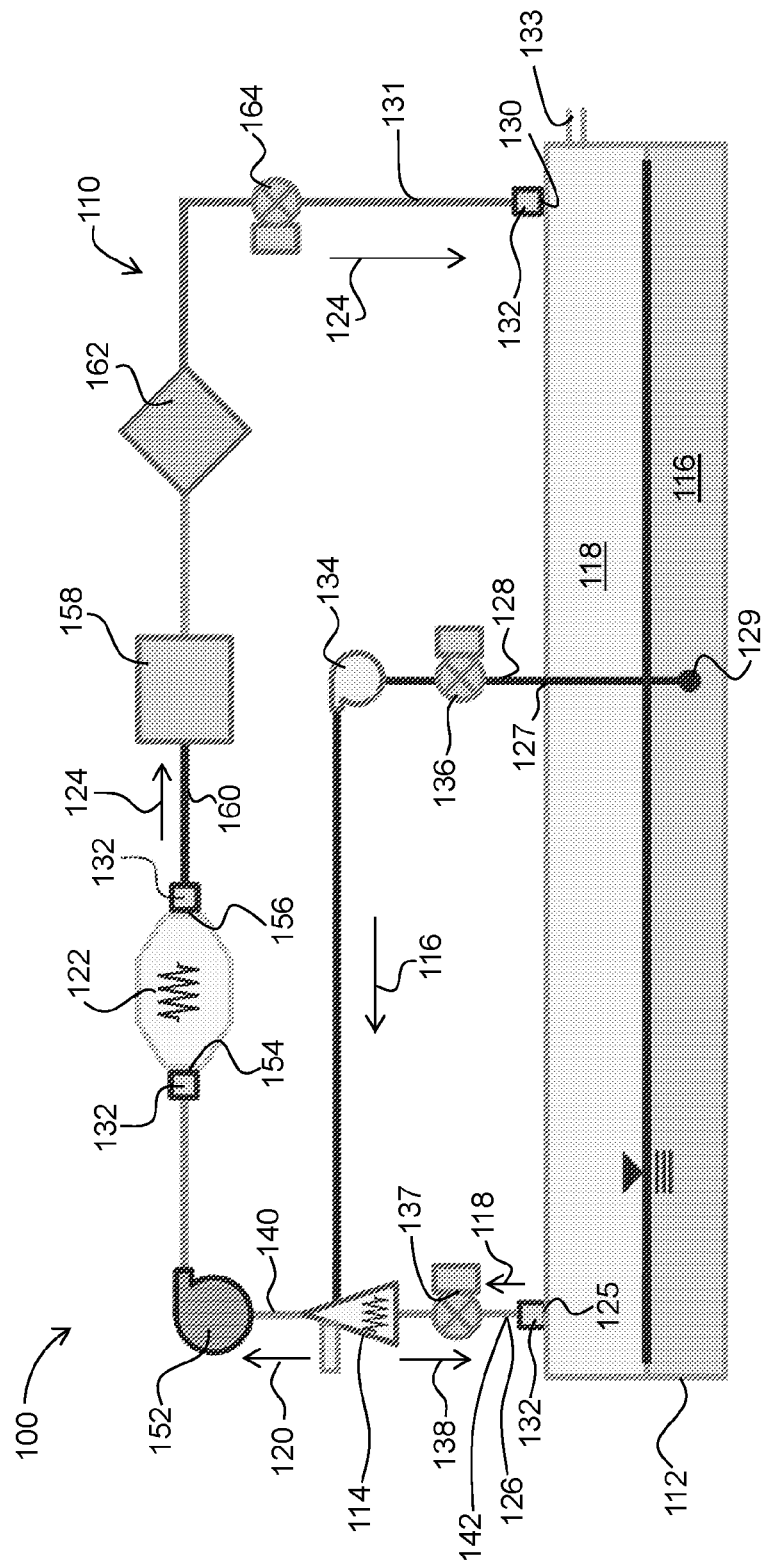
FIG. 3 is a schematic diagram of an exemplary inerting system according to an embodiment of the invention.

FIG. 3 shows an exemplary embodiment of an inerting system 100 according to the present disclosure that improves upon the conventional ullage-recirculating catalytic inerting system 10. According to an aspect of the present disclosure, the inerting system 100 is configured to supplement the ullage gas from a gas tank with a quantity of additional fuel vapor, which this enriched gas mixture is then supplied into a reactor to thereby enhance the conversion of flammable species (e.g., fuel vapor and oxygen) in the gas mixture to non-flammable species (e.g., carbon dioxide) that may then be returned to the fuel tank. The exemplary inerting system 100 may modify conventional inerting systems, such as the CIS 10, to provide such advantageous features; or the inerting system 100 may be specially constructed depending on the requirements of the application, as would be understood by those having ordinary skill in the art.

As shown in the illustrated embodiment, the exemplary inerting system 100 generally includes a fluid circuit 110 that is fluidly connectable to a fuel tank 112 via one or more fluid conduits or passages (shown schematically). An evaporator 114 is fluidly connected in the fluid circuit 110 for receiving a flow of liquid fuel 116 from the fuel tank 112. The evaporator 114 is configured to volatilize at least a portion of the liquid fuel 116 to thereby form a volatilized fuel vapor 117 (shown in FIG. 4, for example). The evaporator 114 also is configured to receive a flow of ullage gas 118, and is configured to permit the ullage gas 118 to sweep away the volatilized fuel vapor 117 downstream with the ullage gas 118 to thereby form an enriched gas mixture 120 containing the ullage gas 118 and the volatilized fuel vapor 117. A reactor 122 is fluidly connected in the fluid circuit 110 downstream of the evaporator 114, and is configured to convert at least a portion of the gas mixture 120 into a non-flammable gas 124. The fluid circuit 110 is configured to supply at least some of the non-flammable gas 124 generated by the reactor 122 to the fuel tank 112.

The fuel tank 112 may be any suitable fuel tank for the particular application. The fuel tank 112 may be a conventional fuel tank, such as the fuel tank 16 in the CIS 10. The fuel tank 112 includes a first outlet 125, such as an outlet port, to which an ullage supply conduit 126 of the circuit 110 is fluidly connected for supplying the ullage gas 118 to the evaporator 114. The fuel tank 112 also includes a second outlet 127, such as an outlet port, to which a liquid fuel supply conduit 128 is fluidly connected for supplying the liquid fuel 116 to the evaporator 114. As shown, the liquid fuel supply conduit 128 extends toward a bottom of the fuel tank 112 and includes an inlet portion 129 for withdrawing the liquid fuel 116. The fuel tank 112 also includes an inlet 130, such as an inlet port, to which a gas return conduit 131 of the circuit 110 is fluidly connected for supplying the non-flammable gas 124 to the fuel tank 112. Suitable flame arresters 132 may be provided at the outlet 125 and the inlet 130. Generally, the fuel tank 112 is sealed to contain the ullage gas 118 in the tank. An ambient vent 133 also may be provided in the fuel tank 112 to equilibrate pressure when exposed to super-atmospheric or sub-atmospheric conditions, for example.

A pump 134 may be fluidly connected in the fluid circuit 110 for supplying the liquid fuel 116 to the evaporator 114. In the illustrated embodiment, the pump 134 is located in the liquid fuel supply conduit 128, although other locations are possible. The pump 134 may be any suitable fuel pump for supplying the desired amount of liquid fuel to the evaporator 114. The pump 134 may provide a constant pressure and/or constant flow rate of the liquid fuel; or the pump 134 may provide a variable pressure and/or variable flow rate of the liquid fuel. A controller (not shown) may be operably coupled to the pump 134 for controlling the desired pressure and/or flow rate, for example. Alternatively, the liquid fuel 116 could be gravity fed to the evaporator 114 without a pump 134. As shown, a valve 136, such as an isolation valve or flow control valve, may be provided in the liquid fuel supply conduit 128 downstream of the fuel tank 112 to control or prevent flow of the liquid fuel 116 into the circuit 110.

The evaporator 114 is fluidly connected in the fluid circuit 110 for receiving the liquid fuel 116 and the ullage gas 118. In the illustrated embodiment, for example, the evaporator 114 is fluidly connected to the liquid fuel supply conduit 128 and the ullage supply conduit 126. As shown, a valve 137, such as an isolation valve or flow control valve, may be provided in the ullage supply conduit 126 downstream of the fuel tank 112 to control or prevent flow of the ullage gas 118 into the circuit 110.

Figure 4:
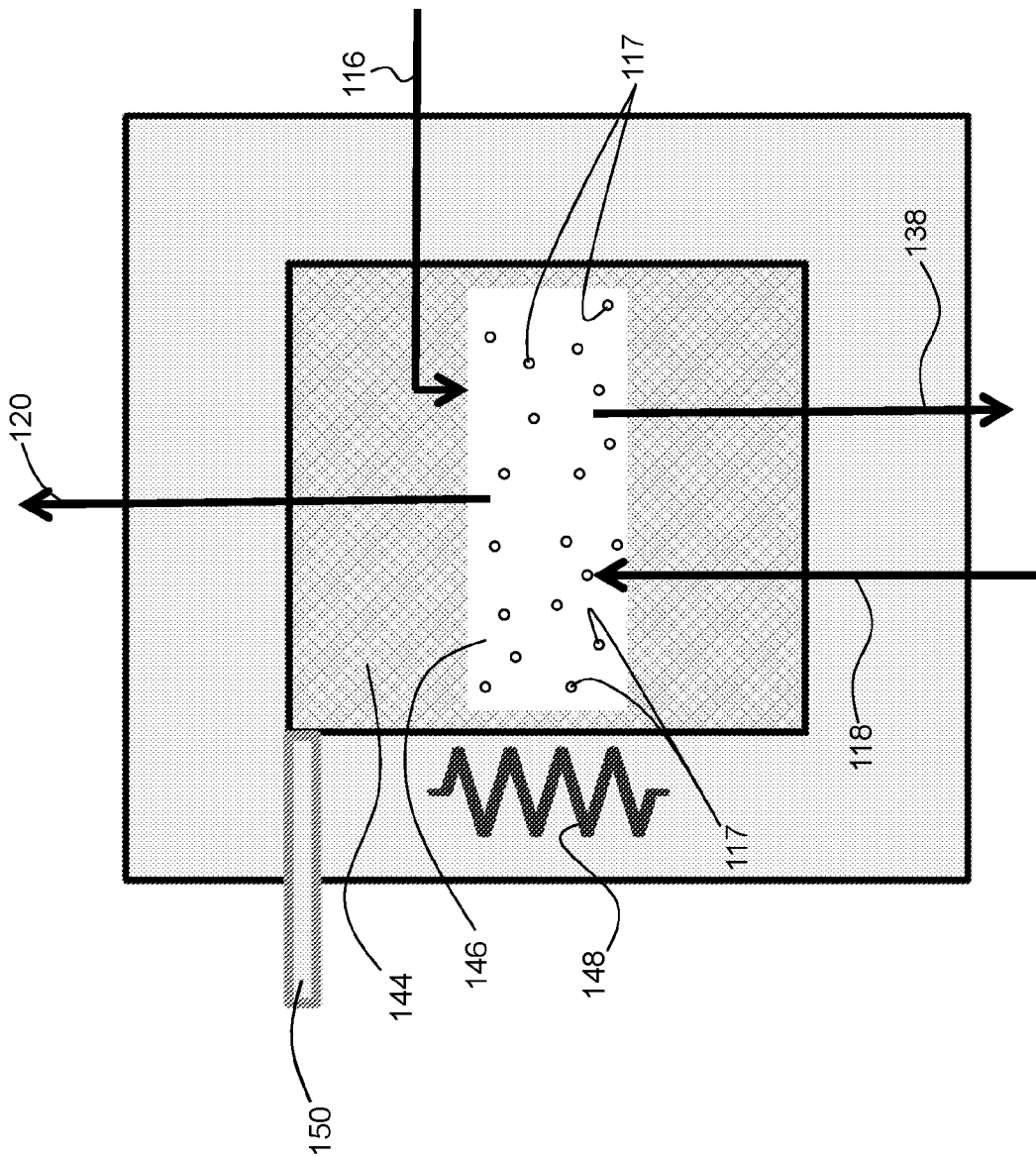
FIG. 4 is a schematic enlarged view of an exemplary evaporator in the inerting system in FIG. 3.

Referring to FIG. 4, a schematic diagram of the exemplary evaporator 114 is shown in further detail. As shown, the evaporator 114 receives the liquid fuel 116 (such as via an inlet port connected to conduit 128) and receives the ullage gas 118 (such as via another inlet port connected to conduit 126). As discussed above, the evaporator 114 is configured to volatilize at least a portion of the liquid fuel 116 to thereby form a volatilized fuel vapor 117. For example, the evaporator 114 may heat the liquid fuel 116 to a temperature that volatilizes the lower molecular weight components of the liquid fuel 116 to form the fuel vapor 117, while the higher molecular weight components remain in a liquid state as unevaporated liquid fuel 138. The evaporator 114 is configured to permit the ullage gas 118 to sweep away the volatilized fuel vapor 117 downstream with the ullage gas 118 to thereby form an enriched gas mixture 120 containing the ullage gas 118 and the volatilized fuel vapor 117. This enriched gas mixture 120 may exit the evaporator 114 via an evaporator outlet, which may be fluidly connected to a reactor supply conduit 140 (shown in FIG. 3) for supplying the gas mixture 120 downstream to the reactor 122.

The separation of the volatilized fuel vapors 117 from the unevaporated liquid fuel 138 may enable separation of contaminants that may affect the performance of the reactor 122. Such contaminants tend to be heavier and less volatile than the lighter ends of the liquid fuel 116 that are volatilized by heating in the evaporator 114. Therefore, the volatilized fuel vapors 117 may inherently contain less contaminants than the unevaporated liquid fuel 138, thereby improving the life of the reactor 122. In exemplary embodiments, the unevaporated liquid fuel 138 is permitted to return to the fuel tank 112 via a liquid fuel return passage 142. In the illustrated embodiment, the liquid fuel return conduit 142 and the ullage supply conduit 126 are the same, thereby forming a shared passage for the ullage gas 118 and the return (unevaporated) liquid fuel 138 along the entire length of the shared conduit 126, 142.

In exemplary embodiments, the evaporator 114 may include a heated medium 144 that enables the ullage gas 118 to flow therethrough while also enabling the liquid fuel 116 to flow therethrough. The heated medium 144 may have an interaction zone 146 in which the volatilized fuel vapors 117 interact with the ullage gas 118 allowing the fuel vapors to be swept away in the downstream direction with the ullage gas. The interaction of the ullage gas 118 and fuel vapors 117 may include a sparging process. The evaporator 114 may include a heater 148, such as an electric heater, that is in thermal communication with the medium 144 for heating thereof. One or more temperature sensors 150 also may be provided in the evaporator 114 for measuring and/or controlling the temperature of the medium 144 via the heater 148 and/or controlling a temperature of the gas mixture 120. The sensor(s) 150 and/or the heater 148 may be operably coupled to a controller (not shown) for controlling the temperature of the medium 144 and/or gas mixture 120, and thereby the amount of fuel vapors contained in the gas mixture 120, as discussed in further detail below.

In exemplary embodiments, the heating medium includes a porous medium, such as a high surface area substrate bed that enables the fuel vapors 117 to be liberated from the liquid fuel 116, and allows the ullage gas 118 passing through the substrate at ambient pressure to carry away the fuel vapors 117. In exemplary embodiments, the medium (e.g., substrate) may include one or more of: a matrix of metal wire meshes, such as a stack of wire mesh discs or sheets; open celled foam, such as pyrolyzed foam with silicon carbide vapor deposition coating; metal or ceramic beads, or other high surface area to volume shapes; metal fibers, such as stainless-steel wool; metal plates or vanes; and designed high surface area geometries that are 3D printed in metallic materials. These examples are not intended to be limiting, and the heated medium 144 may be made of any suitable material in any suitable configuration as would be understood by those having ordinary skill in the art.

In exemplary embodiments, the evaporator 114 (e.g., heated medium 144) is controlled by active heating (e.g., via heater 148) to provide the desired mole fraction of fuel vapor in the gas mixture 120 (including volatized fuel vapor 117 and fuel vapor contained in the ullage gas 118) that is introduced into the reactor 122. The fuel vapor mole fraction is equal to partial pressure divided by total pressure, and the partial pressure of the fuel vapor is a function of temperature. Therefore, to control the mole fraction of the fuel vapor introduced into the reactor 122, the temperature of the heated medium 144 and/or gas mixture 120 may be controlled as a function of local ambient pressure (i.e., altitude). For example, the controller (not shown) that controls the heater 148 may receive feedback signals from an altitude sensor (not shown) and/or a pressure sensor (not shown), and utilize such feedback (such as with closed-loop logic) to control the heating of the medium 144 and/or gas mixture 120. Such temperature control may be varied during an entire flight profile to account for temperature and/or pressure (i.e., altitude) changes. Such temperature control also may control the degree of volatilization of the liquid fuel 116 into fuel vapors 117. In exemplary embodiments, the flow rate of the liquid fuel 116 into the evaporator 114 does not need to be controlled, provided a sufficient amount of fuel (e.g., at least a 10:1 mass ratio of liquid-fuel to vapor fuel) is continuously provided to the evaporator 114. Alternatively, the amount of liquid fuel 116 introduced into the evaporator 114 may be controlled, such as via feedback control of the pump 134 via the controller (not shown). In general, the resulting mixture 120 of ullage gas 118 and volatilized fuel vapor 117 is controlled to enhance the fuel vapor content of this reaction gas 120, such as slightly below the LFL (e.g., fuel to air equivalence ratio of about 0.5 for Jet A fuel (FIG. 2); or approximately 0.75% of Jet A fuel vapor by volume at sea level ambient air conditions, for example). This makes the reaction gas 120 inherently non-flammable, while also enhancing the reactor's conversion of the gas mixture 120 to the non-flammable gas 124.

In a non-liming example, a hypothetical set of conditions may be considered. Although numerous researchers have characterized flammability limits in various ways for various fuels, the Federal Aviation Administration (FAA) provides a numerical methodology in which flammability limits may be directly calculated in terms of fuel temperature as a function of altitude when the flash point of the fuel is known (reference 14 CFR Part 25, Appendix N). This methodology is useful in the context of setting a fuel temperature inside the fuel evaporator that is outside the range of the flammability limits. Using the mean flash point defined by the FAA of 120° F., the corresponding LFL at sea level is 10° F. below this value, which in the case of the mean flash point fuel is 110° F. The FAA also defines an LFL reduction as a function of altitude of 1° F. per every 808 feet above sea level. If an operating altitude of 10,000 feet above sea level is considered in this example, the LFL would then be 97.6° F. This result provides useful guidance for setting the operating temperature of the evaporator 114 as a function of altitude. For example, FIG. 2 suggests that the true vapor pressure of the Jet A fuel at this temperature would be approximately 0.102 psi. At 10,000 ft this partial pressure of fuel vapor would correspond to a mole fraction of fuel of approximately 0.7%. It may be desired to operate the fuel evaporator 114 at a discharge mole fraction below this value. For this non-limiting example, a value of 0.5% fuel vapor by volume is used. Further assuming a nominal ullage gas flow rate into the fuel evaporator of 1 liter per second, the discharge fuel vapor mass flow rate would be approximately 1 g/min. Assuming that 10% of the liquid fuel 116 entering the fuel evaporator 114 is volatilized and carried away in the discharge stream 120, a liquid fuel flow rate 10X greater than the discharge fuel vapor flow rate may be desired. In the hypothetical case, a liquid fuel 116 flow rate of 10 g/min is desired, which implies that 9 g/min of unevaporated liquid fuel 138 is returned to the fuel tank. It is understood that the foregoing is merely exemplary, and other suitable flow rates and/or quantities of the liquid fuel 116 may be introduced into the evaporator 114 as may be desired depending on the application or operational conditions, which would be understood by those having ordinary skill in the art.

Referring again to FIG. 3, the system 100 may include a blower 152 fluidly connected in the fluid circuit 110 for moving the gas mixture 120 downstream toward the reactor 122. The blower 152 also may move the ullage gas 118 from the fuel tank 112 to the evaporator 114. The blower 152 may be any suitable blower for moving the gas(es) in the fluid circuit 110. For example, the blower 152 may be a conventional blower, such as the blower 12 in the CIS 10. The blower 152 may be located at any suitable position in the fluid circuit 110 for providing a suction force and/or a blowing force of the gases in the circuit 110. For example, in the illustrated embodiment, the blower 152 is connected in the reactor supply conduit 140 downstream of the evaporator 114 and upstream of the reactor 122 for drawing the ullage gas 118 into the evaporator 114, and drawing the gas mixture 120 out of the evaporator 114 and pushing it downstream toward the reactor 122.

The reactor 122 is fluidly connected in the fluid circuit 110 downstream of the evaporator 114, and is configured to convert the flammable gas components of the gas mixture 120 (e.g., oxygen and fuel vapor) into non-flammable gas components (e.g., water and carbon dioxide) in the reacted gas 124. The gas mixture 120 also may contain nitrogen from the ullage gas 118, which may not participate in the reaction of the reactor 122, and thus may pass through as an inert component in the reacted non-flammable gas 124. In exemplary embodiments, the reactor 122 is a catalytic reactor 122 that causes a catalytic reaction of the gas mixture 120 for conversion thereof. The catalytic reactor 122 may be a conventional catalytic reactor, such as the reactor 18 in the CIS 10, which may include a heated catalyst bed having catalytic materials that are well-known in the art. Alternatively, the reactor 122 may be another type of reactor, or a reactor specially designed for converting the gas mixture 120. As shown, flame arresters 132 may be included on an inlet 154 and outlet 156 of the reactor 122.

A heat exchanger 158 may be fluidly connected in the fluid circuit 110 downstream of the reactor 122 for cooling the reacted non-flammable gas 124. As shown, the heat exchanger 158 is fluidly connected to a reactor exhaust conduit 160 that is connected to the reactor outlet 156. The heat exchanger 158 may be any suitable heat exchanger well-known in the art, such as the heat exchanger 20 in the CIS 10. The heat exchanger 158 may be a plate-fin heat exchanger, for example, having cooling air channels in fluid communication with the outside air.

A condenser 162 may be fluidly connected in the fluid circuit 110 downstream of the heat exchanger 158 for a condensing at least some components of the non-flammable gas 124, such as the water vapor. The condenser 162 may be any suitable condenser well-known in the art, such as the condenser 22 in the CIS 10. The condenser 162 may include a drain conduit (not shown) for facilitating removal of the condensed water vapor from the gas 124, thereby preventing water from entering the fuel tank 112. As shown, a valve 164, such as an isolation valve or flow control valve, may be provided in the return conduit 131 upstream of the fuel tank 112 to prevent flow through the circuit 110.

Referring to FIGS. 5-11, various alternative embodiments of the exemplary inerting system according to the present disclosure are shown. These various inerting systems (e.g., 200, 300, 400, 500, 600, 700, 800) are substantially the same as the above-referenced inerting system 100, and consequently the same reference numerals but respectively in the 100, 200, 300, 400, 500, 600, 700, and 800-series, are used to denote structures corresponding to similar structures in the inerting systems 100-800. In addition, the foregoing description of the inerting system 100 is equally applicable to the inerting systems 200-800, except as noted below. Moreover, it is understood that aspects of the inerting systems 100-800 may be substituted for one another or used in conjunction with one another where applicable.

Figure 5:
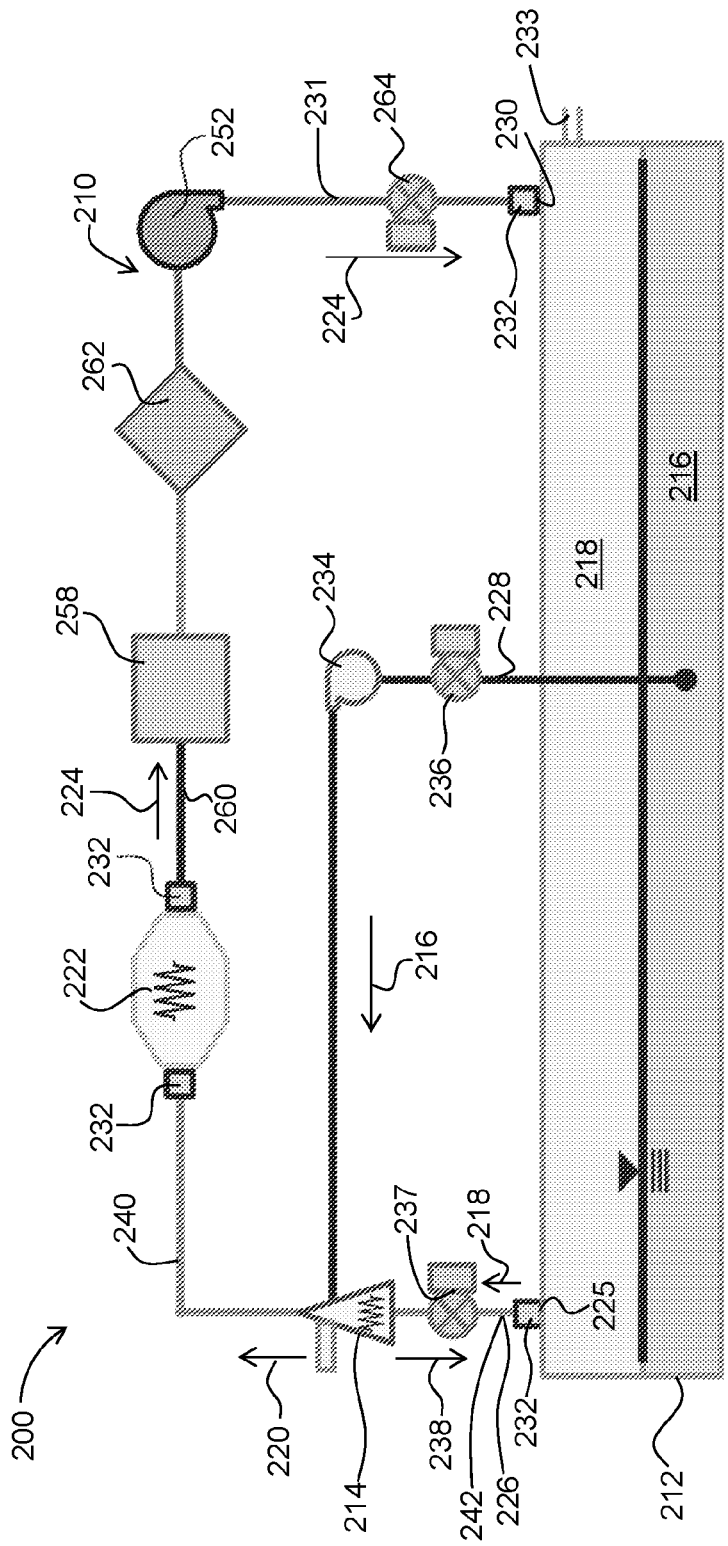
FIG. 5 is a schematic diagram of another exemplary inerting system according to an embodiment of the invention.

FIG. 5 shows an exemplary inerting system 200 in which the blower 252 is located downstream of the reactor 222, such as downstream of the condenser 262. This allows the outlet of the evaporator 214 to be directly and/or relatively closely coupled to the inlet of the reactor 222. This enables the gas mixture 220 exiting the evaporator 214 to more likely remain in the gas phase prior to entering the reactor 222. The location of the blower 252 downstream of the reactor 222 may also eliminate explosion-proof requirements for the electric motor that drives the blower 252. The configuration of the remaining components of the system 200 are the same as the system 100. For example, in the system 200 the unevaporated liquid fuel 238 may flow (e.g., gravity drain) back into the fuel tank 212 through the valve 237 and through the ullage supply conduit 226.

Figure 6:
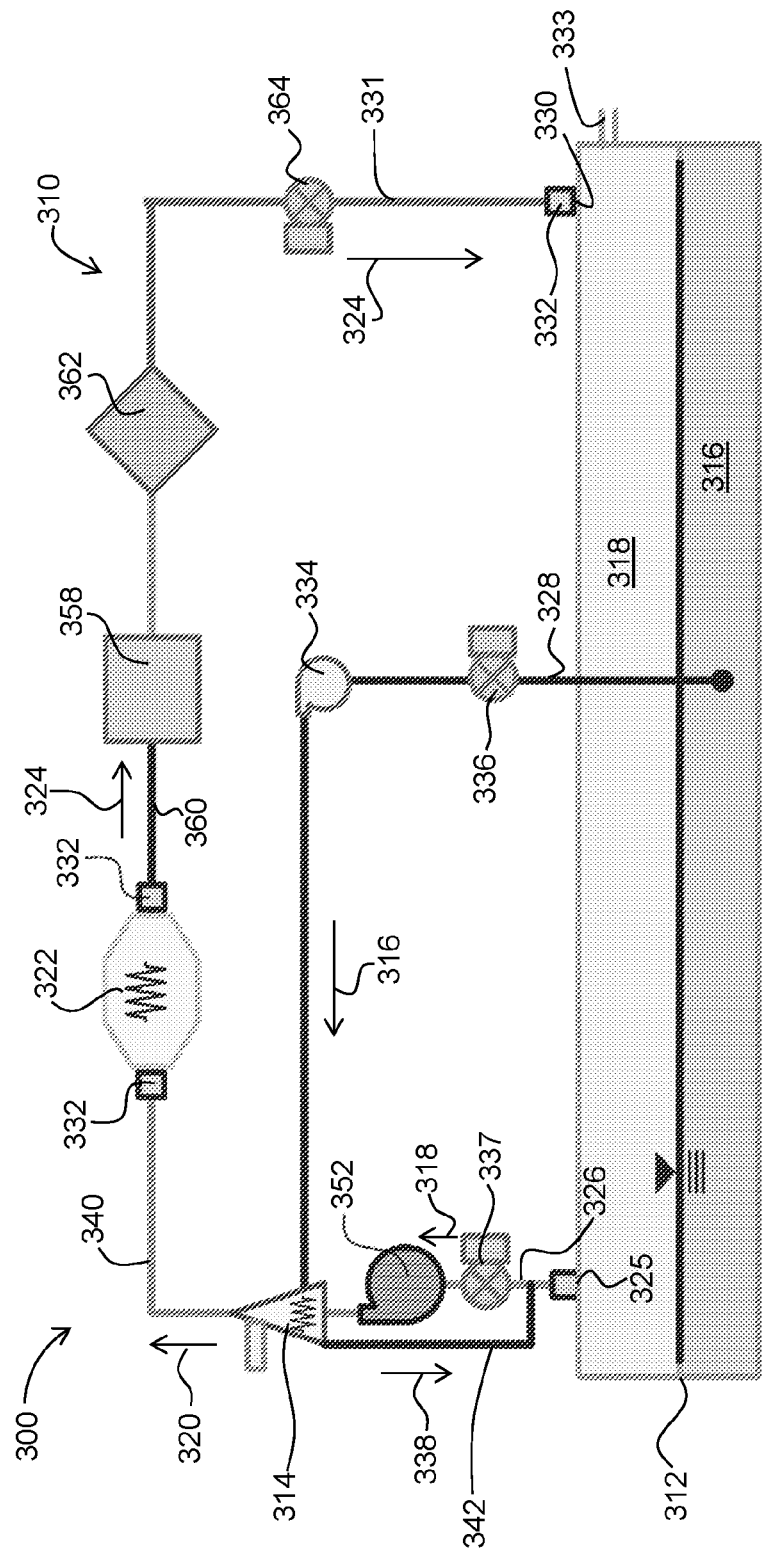
FIG. 6 is a schematic diagram of another exemplary inerting system according to an embodiment of the invention.

FIG. 6 shows an exemplary inerting system 300 in which the blower 352 is located upstream of the ullage inlet of the evaporator 314. This allows the outlet of the evaporator 314 to be directly and/or relatively closely coupled to the inlet of the reactor 322 to promote the gas mixture 320 remaining in the gas phase. The unevaporated liquid fuel 338 is returned to the fuel tank 312 by bypassing the blower 352 through a dedicated liquid return conduit 342 that is separated from at least a portion of the ullage supply conduit 326. The liquid return conduit 342 is connected into the ullage supply conduit 326 to allow the unevaporated liquid fuel 338 to return to the fuel tank 312 via the tank outlet 325. The pressure gradient inherent in the system 300 will tend to drive the unevaporated liquid fuel 338 through the bypass return conduit 342. Although not shown, the liquid return conduit 342 may be connected between the blower 352 and the valve 337 such that the unevaporated return liquid fuel 338 flows (e.g., drains) back through the valve 337. This enables the ullage gas 318 to be completely isolated from the circuit 310 when the valves 337 and 364 are shut.

Figure 7:
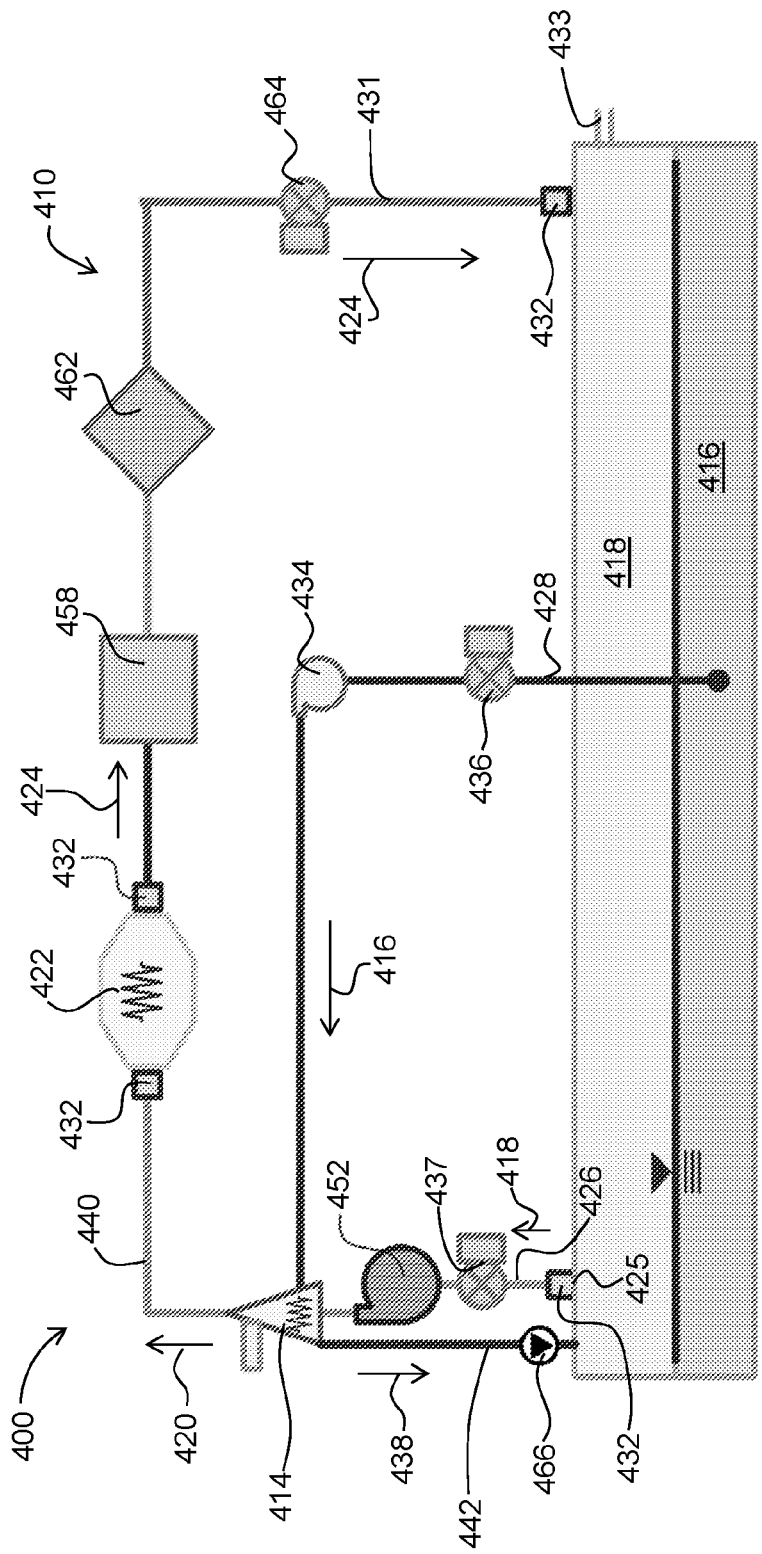
FIG. 7 is a schematic diagram of another exemplary inerting system according to an embodiment of the invention.

FIG. 7 shows an exemplary inerting system 400 in which the blower 452 is located upstream of the evaporator 414, and the outlet of the evaporator 414 is directly and/or closely coupled to the inlet of the reactor 422, similarly to the system 300. In the system 400, the unevaporated liquid fuel 438 is returned to tank 412 via a liquid return conduit 442 that bypasses the ullage supply conduit 426 entirely. The liquid return conduit 442 is ported into the fuel tank 412. A check valve 466 may be connected in the return conduit 442. The check valve 466 will prevent any back flow of the unevaporated liquid fuel 438 into the circuit 410. The pressure gradient inherent in the system 400 will tend to drive the unevaporated liquid fuel 438 through the bypass return conduit 442.

Figure 8:
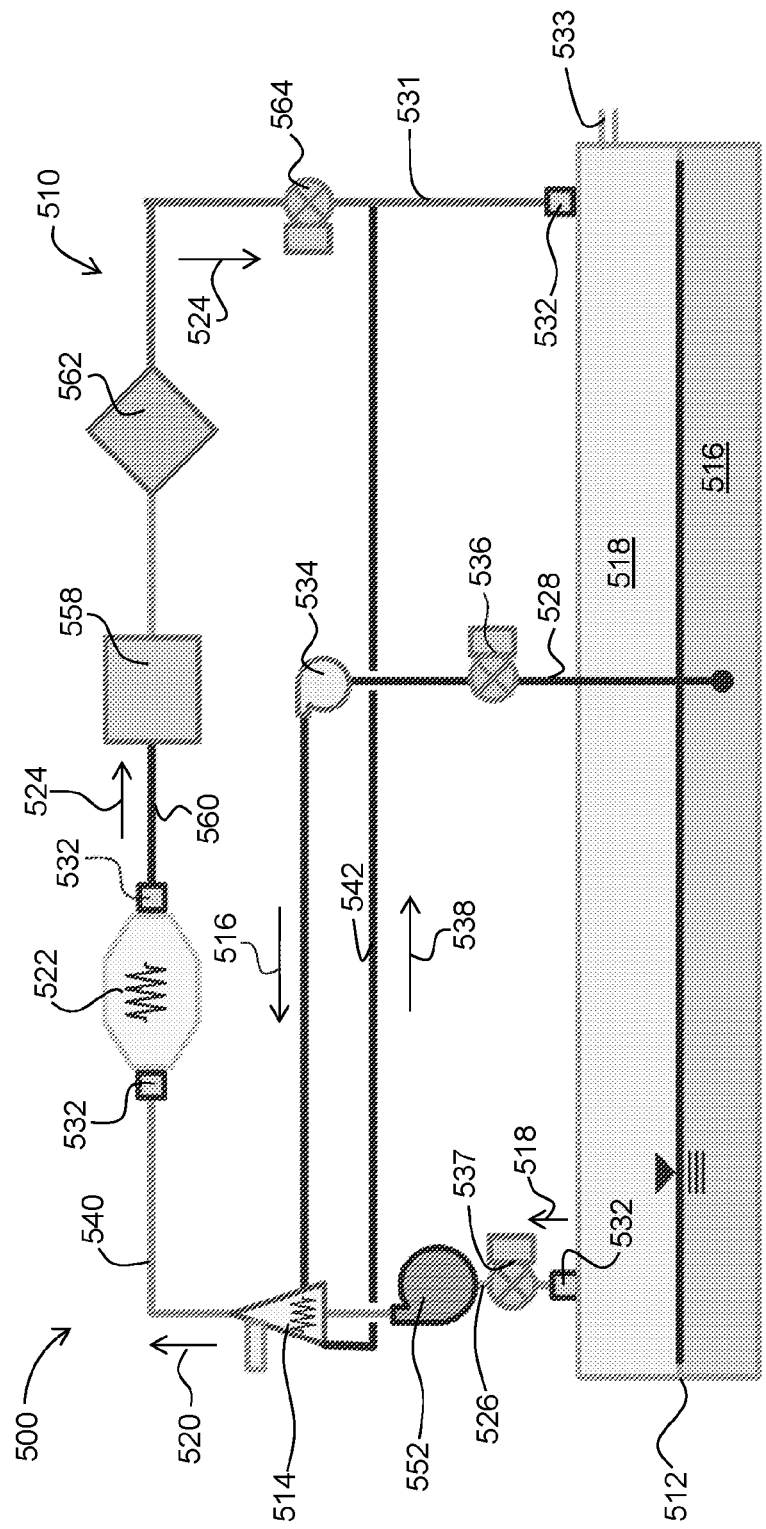
FIG. 8 is a schematic diagram of another exemplary inerting system according to an embodiment of the invention.

FIG. 8 shows an exemplary inerting system 500 in which the blower 552 is located upstream of the evaporator 514, and the outlet of the evaporator 514 is directly and/or closely coupled to the inlet of the reactor 522, similarly to the system 300. In the system 500, the unevaporated liquid fuel 538 is returned to tank 512 via liquid return conduit 542 that is connected to the non-flammable gas return conduit 531. The unevaporated liquid fuel 538 then flows back into the fuel tank 512 through the gas return conduit 531. The pressure gradient inherent in the system 500 will tend to drive the unevaporated liquid fuel 538 through the bypass return conduit 542 and into the gas return conduit 531. At this location, the non-flammable (inert) gas 524 is flowing down to the ullage space of the tank 512, so the unevaporated liquid fuel 538 will be urged downstream along with the non-flammable gas.

Figure 9:
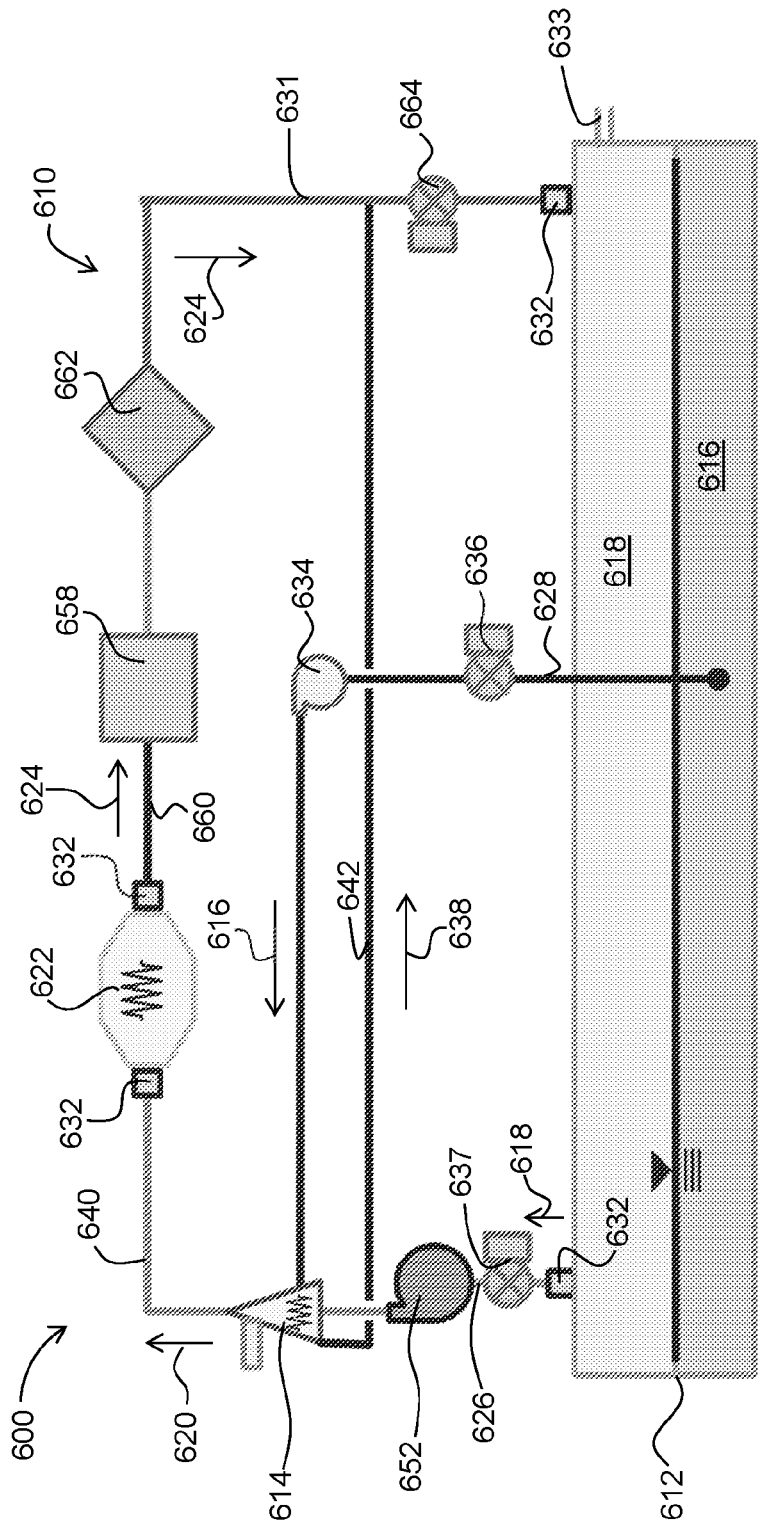
FIG. 9 is a schematic diagram of another exemplary inerting system according to an embodiment of the invention.

FIG. 9 shows an exemplary inerting system 600 that is similar to the system 500, except that the liquid return conduit 642 is connected to the non-flammable gas return conduit 631 upstream of the valve 664. In the system 600, the unevaporated liquid fuel 638 will flow from the evaporator 614 via the liquid return conduit 642, then flow back into the fuel tank 612 through the valve 664 and gas return conduit 631. The pressure gradient inherent in the system 600 will tend to drive the unevaporated liquid fuel 638 through the bypass return conduit 642 and into the gas return conduit 631. At this location, the non-flammable (inert) gas 624 is flowing down to the ullage space of the tank 612, so the unevaporated liquid fuel 638 will be urged downstream along with the non-flammable gas 624. Additionally, the system 600 can be completely isolated from the ullage when the isolation valves 637, 664 are closed. The blower 652 is located upstream of the evaporator 614, and the outlet of the evaporator 614 is directly and/or closely coupled to the inlet of the reactor 622.

Figure 10:
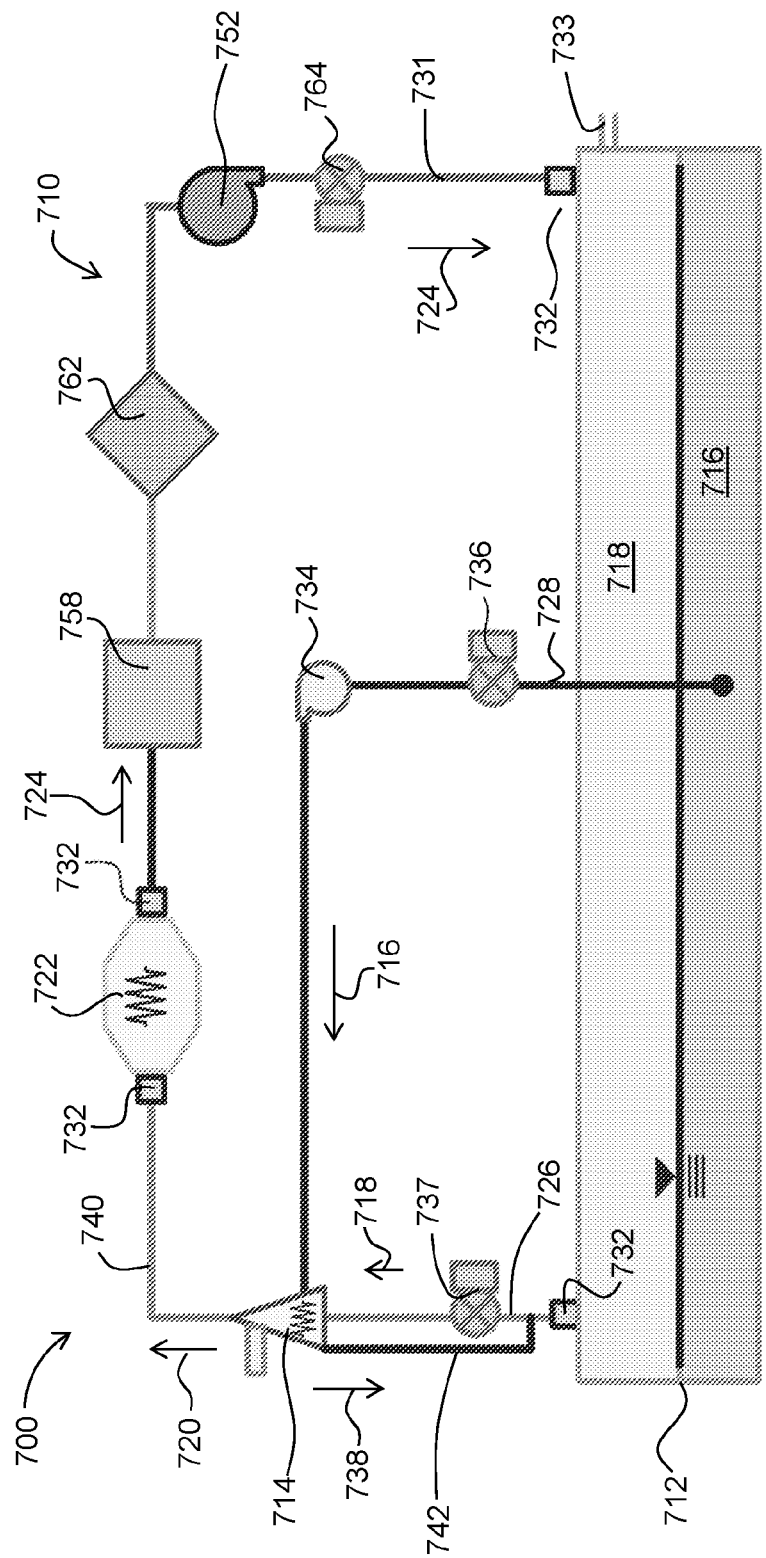
FIG. 10 is a schematic diagram of another exemplary inerting system according to an embodiment of the invention.

FIG. 10 shows an exemplary inerting system 700 that is similar to the system 300, except for the location of the blower 752. In the system 700, the blower 752 is located downstream of the reactor 722, such as downstream of the condenser 762. This allows the outlet of the evaporator 714 to be directly and/or relatively closely coupled to the inlet of the reactor 722 to promote the gas mixture 720 to remain in the gas phase. In the system 700, the unevaporated liquid fuel 738 is returned to tank 712 via dedicated liquid return conduit 742 that is connected into the ullage supply conduit 726. The dedicated liquid return conduit 742 may be connected so as to bypass the valve 737 (as shown), or may be connected to require the return liquid fuel 738 to flow through the valve 737.

Figure 11:
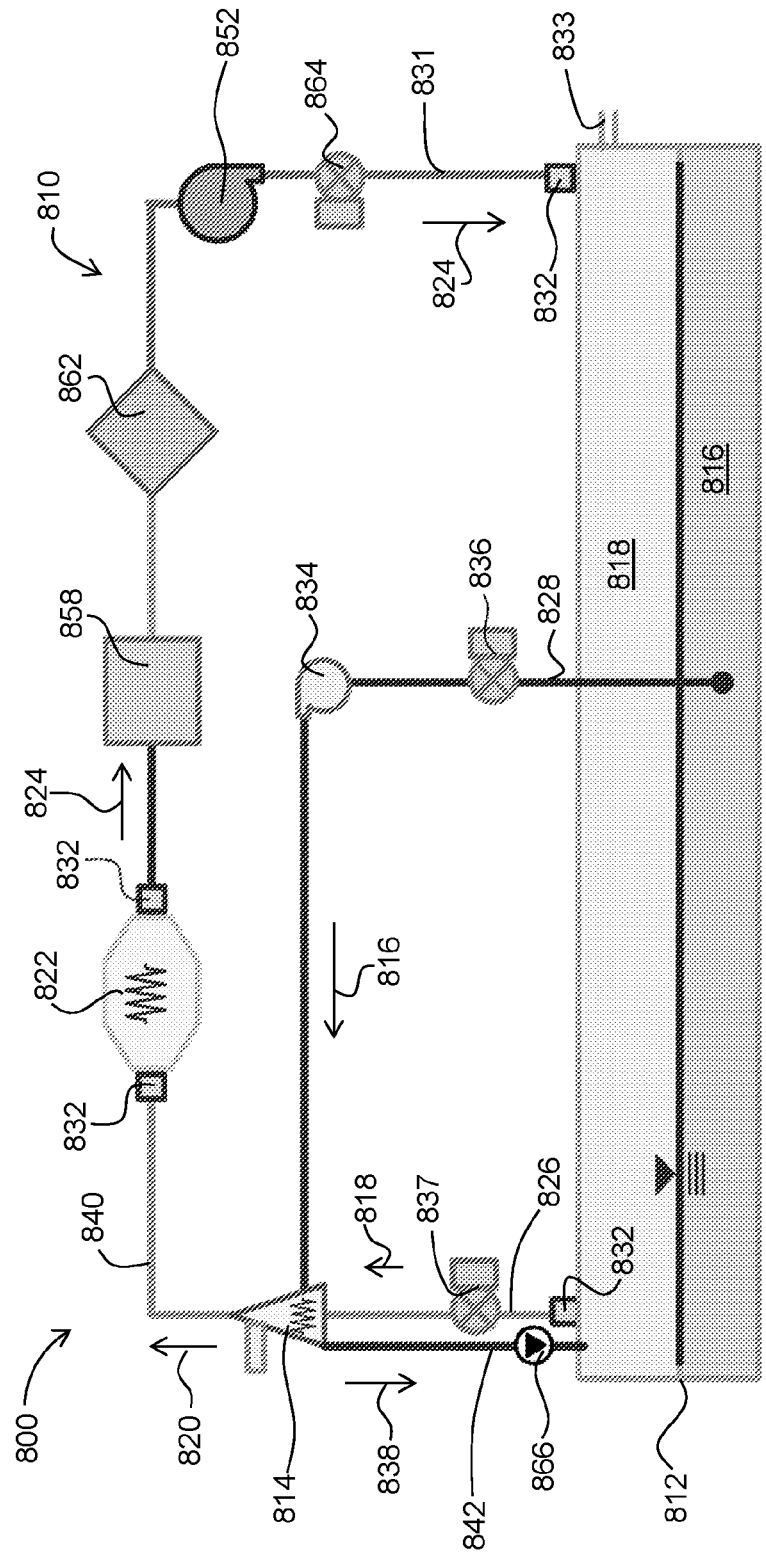
FIG. 11 is a schematic diagram of another exemplary inerting system according to an embodiment of the invention.

FIG. 11 shows an exemplary inerting system 800 that is similar to the system 400, except for the location of the blower 852. In the system 800, the blower 852 is located downstream of the reactor 822, such as downstream of the condenser 862, which allows the outlet of the evaporator 814 to be directly and/or relatively closely coupled to the inlet of the reactor 822. In the system 800, the unevaporated liquid fuel 838 is returned to tank 812 via a liquid return conduit 842 that bypasses the ullage supply conduit 826 entirely. The liquid return conduit 842 is ported into the fuel tank 812. A check valve 866 may be connected in the return conduit 842. The check valve 866 will prevent any back flow of the unevaporated liquid fuel 838 into the circuit 810.

An exemplary inerting system 100, 200, 300, 400, 500, 600, 700, 800 for a fuel tank containing a liquid fuel and an ullage gas has been described herein. The inerting system 100-800 generally includes a fluid circuit fluidly connectable to the fuel tank, an evaporator connected in the fluid circuit, and a reactor connected in the fluid circuit downstream of the evaporator. The evaporator is configured to receive a flow of the liquid fuel from the fuel tank and volatilize at least a portion of the liquid fuel to thereby form a volatilized fuel vapor. The evaporator also is configured to receive a flow of the ullage gas from the fuel tank, and permit the ullage gas to sweep away the volatilized fuel vapor downstream with the ullage gas to thereby form an enriched gas mixture containing the ullage gas and the volatilized fuel vapor. The reactor is configured to convert at least a portion of the enriched gas mixture into a non-flammable gas. The fluid circuit is configured to supply at least a portion of the non-flammable gas to the fuel tank.

Exemplary advantages of such an exemplary inerting system 100-800 may include, but are not limited to, one or more of the following: (i) maintaining a high, non-flammable level of fuel vapor at the inerting system's reactor inlet across the entire flight profile by controlling the evaporator's (e.g., body or medium) temperature with a heat source; (ii) producing fuel vapors with a relatively small amount of heat since a small amount of liquid fuel may being continuously warmed up; (iii) potentially eliminating active flow control of the liquid fuel flow rate into the evaporator, provided a sufficient amount of the liquid fuel is continuously provided to the evaporator; (iv) simultaneously evaporating the liquid fuel and mixing it with ullage gas; (v) separating the volatilized fuel vapor from the liquid fuel by using the ullage gases to sweep fuel vapors against gravity; (vi) allowing the unevaporated liquid fuel to fall in the direction of gravity; (vii) allowing the evaporator to be oriented vertically or at an angle relative to vertical, provided the unevaporated liquid fuel tends to flow toward the tank; (viii) enabling the unevaporated liquid fuel to return to the tank either though the existing ullage gas supply line via the tank outlet, or through the existing inert gas return line via the tank inlet; and (ix) enabling most of the liquid fuel contaminants to separate from the volatilized fuel vapors that feed the reactor, such contaminants tending to be heavier and less volatile than the lighter ends of the fuel that are liberated by heating in the evaporator, thus enabling the volatilized fuel vapors to inherently contain less contaminants than the un-evaporated liquid fuel, thereby resulting in longer reactor life.

In exemplary embodiments, the inerting system 100-800 may include, but is not limited to, one or more of the following exemplary features: (i) a heated, high surface area substrate bed that is in intimate contact with both liquid fuel and ullage gases; (ii) utilizing an existing ullage gas supply line or an inert gas return line that is inherent in the basic CIS architecture to return the unevaporated liquid fuel back to the tank, thus facilitating retrofitting of the inerting system 100-800 to an existing fuel tank; (iii) orienting the unevaporated liquid fuel return such that the inherent pressure gradient in the system tends to drive the unevaporated liquid fuel back to the fuel tank; (iv) providing a method of controlling the fuel vapor content in the reactor feed stream, which may include closed loop controlling the evaporator's temperature to a setpoint value, where the temperature setpoint may be a function of ambient pressure.

Further exemplary advantages of the exemplary the inerting system 100-800 may include, but are not limited to, one or more of the following: (i) using the system without high pressure fuel or air; (ii) not requiring complex mechanisms; (iii) not requiring complex electronics or high speed mechanical elements; (iv) not needing to bring a relatively large pool of fuel up to boiling temperature at the local pressure; and (v) not needing to mix fuel vapors and air using an additional device.

According to one aspect of the present disclosure, a catalytic inerting system is provided which includes a fuel pump for pumping a constant flow of liquid fuel from the fuel tank to a heated evaporator that produces a constant flow of fuel vapor from the liquid fuel which is supplied to a catalytic reactor in which the fuel vapor reacts to produce an inert gas flow that produces an inert environment in an ullage portion of a fuel tank.

According to another aspect of the present disclosure, the system further includes a blower for supplying the inert gas flow to the ullage portion of the fuel tank and/or a blower for supplying the fuel vapor enriched ullage gas to the catalytic reactor.

According to another aspect of the present disclosure, the system further includes a pathway between the heated evaporator and the fuel tank, wherein a portion of the liquid fuel that is not evaporated in the heated evaporator is returned to the fuel tank via the pathway.

According to an aspect of the present disclosure, an inerting system for a fuel tank containing a liquid fuel and an ullage gas, includes: a fluid circuit fluidly connectable to the fuel tank; an evaporator connected in the fluid circuit, the evaporator being configured to receive a flow of the liquid fuel from the fuel tank and volatilize at least a portion of the liquid fuel to thereby form a volatilized fuel vapor, and wherein the evaporator is configured to receive a flow of the ullage gas from the fuel tank, and is configured to permit the ullage gas to sweep away the volatilized fuel vapor downstream with the ullage gas to thereby form a fuel-enriched gas mixture containing the ullage gas and the volatilized fuel vapor; and a reactor connected in the fluid circuit downstream of the evaporator, the reactor being configured to convert at least a portion of the fuel-enriched gas mixture into a non-flammable gas; and wherein the fluid circuit is configured to supply at least a portion of the non-flammable gas to the fuel tank.

Embodiments according to the present disclosure may include one or more of the following additional features, separately or in any combination.

In some embodiments, the inerting system further includes a pump connected in the fluid circuit, the pump being configured to pump the liquid fuel from the fuel tank to the evaporator.

In some embodiments, the pump is located downstream of the fuel tank and upstream of the evaporator.

In some embodiments, the evaporator includes a heated medium that is in thermal communication with the liquid fuel to enable volatilization of at least a portion thereof.

In some embodiments, the heated medium is porous thereby enabling the ullage gas to flow therethrough and enabling the liquid fuel to flow therethrough.

In some embodiments, the heated medium includes an interaction zone in which the volatilized fuel vapors interact with the ullage gas allowing the volatilized fuel vapors to be swept away in a downstream direction with the ullage gas.

In some embodiments, the evaporator is heated with a heater,

In some embodiments, the heater is controlled to change a temperature of the evaporator in response to a change in altitude and/or atmospheric pressure during operation of the system.

In some embodiments, the heater is controlled to change a temperature of the evaporator in response to a change in liquid fuel flow rate, liquid fuel temperature, ullage gas flow rate, ullage gas temperature, ullage gas volume, and/or ullage gas oxygen concentration.

In some embodiments, the fluid circuit includes an ullage supply passage for fluidly connecting the evaporator with the fuel tank to enable the ullage gas to be supplied from the fuel tank to the evaporator.

In some embodiments, a portion of the liquid fuel that is not volatilized by the evaporator remains as unevaporated liquid fuel, and wherein the fluid circuit includes a liquid fuel return passage configured to return the unevaporated liquid fuel to the fuel tank.

In some embodiments, the ullage supply passage is shared with the liquid fuel return passage.

In some embodiments, at least a portion of the liquid fuel return passage is shared with a return passage for gas exiting the reactor.

In some embodiments, at least a portion of the ullage supply passage is separate from the liquid fuel return passage.

In some embodiments, the inerting system further includes a blower connected in the fluid circuit that is configured to move the ullage gas and/or the fuel-enriched gas mixture through at least a portion of the fluid circuit.

In some embodiments, the blower is located downstream of the evaporator and configured to provide a suction force that draws the ullage gas and/or the fuel-enriched gas mixture out of the evaporator.

In some embodiments, the blower is located upstream of the evaporator and configured to provide a blowing force that pushes the ullage gas and/or the fuel-enriched gas mixture out of the evaporator.

In some embodiments, the reactor is a catalytic reactor that is configured to convert fuel vapor and oxygen contained in the fuel-enriched gas mixture into carbon dioxide and water vapor contained in the non-flammable gas; optionally wherein the fuel-enriched gas mixture and the non-flammable gas further contain nitrogen.

In some embodiments, the inerting system further includes a heat exchanger connected in the fluid circuit downstream of the reactor, the heat exchanger being configured to cool the gas exiting the reactor.

In some embodiments, the inerting system further includes a condenser connected in the fluid circuit downstream of the reactor, the condenser being configured to condense at least one component of the non-flammable gas into a liquid state.

In some embodiments, the inerting system further includes the fuel tank.

In some embodiments, the inerting system is a closed-loop ullage recirculating system.

In some embodiments, the inerting system is fluidly connectable to an existing fuel tank for retrofitting thereof.

According to another aspect of the present disclosure, a method of operating an inerting system, includes: pumping a liquid fuel from a fuel tank to an evaporator; using the evaporator to volatilize at least one portion of the liquid fuel to form a fuel vapor; supplying an ullage gas from the fuel tank to the evaporator; using the ullage gas to sweep away the fuel vapor in the evaporator to form a fuel-enriched gas mixture containing the ullage gas and the fuel vapor; using a reactor to convert at least a portion of the fuel-enriched gas mixture to a non-flammable gas; and passing the non-flammable gas to the fuel tank.

In some embodiments, the method further includes: heating the evaporator to a temperature to volatilize the at least one portion of the liquid fuel.

In some embodiments, the temperature is varied by the heating in response to a change in altitude and/or atmospheric pressure.

Alternatively or additionally, the temperature is varied by heating in response to a change in liquid fuel flow rate, liquid fuel temperature, ullage gas flow rate, ullage gas temperature, ullage gas volume, and/or ullage gas oxygen concentration.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An inerting system for a fuel tank containing a liquid fuel and an ullage gas, the inerting system comprising:
   a fluid circuit fluidly connectable to the fuel tank;
   an evaporator connected in the fluid circuit, the evaporator being configured to receive a flow of the liquid fuel from the fuel tank and volatilize at least a portion of the liquid fuel to thereby form a volatilized fuel vapor, and wherein the evaporator is configured to receive a flow of the ullage gas from the fuel tank, and is configured to permit the ullage gas to sweep away the volatilized fuel vapor downstream with the ullage gas to thereby form a fuel-enriched gas mixture containing the ullage gas and the volatilized fuel vapor; and
   a reactor connected in the fluid circuit downstream of the evaporator, the reactor being configured to convert at least a portion of the fuel-enriched gas mixture into a non-flammable gas; and
   wherein:
      the fluid circuit is configured to supply at least a portion of the non-flammable gas to the fuel tank,
      the fluid circuit includes an ullage supply passage for fluidly connecting the evaporator with the fuel tank to enable the ullage gas to be supplied from the fuel tank to the evaporator,
      a portion of the liquid fuel that is not volatilized by the evaporator remains as unevaporated liquid fuel,
      the fluid circuit includes a liquid fuel return passage configured to return the unevaporated liquid fuel to the fuel tank, and the ullage supply passage is shared with the liquid fuel return passage.

2. The inerting system according to claim 1, further comprising a pump connected in the fluid circuit, the pump being configured to pump the liquid fuel from the fuel tank to the evaporator.

3. The inerting system according to claim 2, wherein the pump is located downstream of the fuel tank and upstream of the evaporator.

4. The inerting system according to claim 1, wherein the evaporator includes a heated medium that is in thermal communication with the liquid fuel to enable volatilization of at least a portion thereof.

5. The inerting system according to claim 4, wherein the heated medium is porous thereby enabling the ullage gas to flow therethrough and enabling the liquid fuel to flow therethrough.

6. The inerting system according to claim 5, wherein the heated medium includes an interaction zone in which the volatilized fuel vapors interact with the ullage gas allowing the volatilized fuel vapors to be swept away in a downstream direction with the ullage gas.

7. The inerting system according to claim 1, wherein the evaporator is heated with a heater.

8. The inerting system according to claim 7, wherein a controller is configured to control the heater to change a temperature of the evaporator in response to a change in altitude and/or atmospheric pressure during operation of the system;
alternatively or additionally, wherein the controller is configured to control the heater to change a temperature of the evaporator in response to a change in liquid fuel flow rate, liquid fuel temperature, ullage gas flow rate, ullage gas temperature, ullage gas volume, and/or ullage gas oxygen concentration.

9. The inerting system according to claim 1, further comprising a blower connected in the fluid circuit that is configured to move the ullage gas and/or the fuel-enriched gas mixture through at least a portion of the fluid circuit.

10. The inerting system according to claim 9, wherein the blower is located downstream of the evaporator and configured to provide a suction force that draws the ullage gas and/or the fuel-enriched gas mixture out of the evaporator.

11. The inerting system according to claim 9, wherein the blower is located upstream of the evaporator and configured to provide a blowing force that pushes the ullage gas and/or the fuel-enriched gas mixture out of the evaporator.

12. The inerting system according to claim 1, wherein the reactor is a catalytic reactor that is configured to convert fuel vapor and oxygen contained in the fuel-enriched gas mixture into carbon dioxide and water vapor contained in the non-flammable gas; optionally wherein the fuel-enriched gas mixture and the non-flammable gas further contain nitrogen.

13. The inerting system according to claim 1, further comprising a heat exchanger connected in the fluid circuit downstream of the reactor, the heat exchanger being configured to cool the gas exiting the reactor.

14. The inerting system according to claim 1, further comprising a condenser connected in the fluid circuit downstream of the reactor, the condenser being configured to condense at least one component of the non-flammable gas into a liquid state.

15. The inerting system according to claim 1, further comprising the fuel tank; and wherein the inerting system is a closed-loop ullage recirculating system.

16. The inerting system according to claim 1, wherein the inerting system is fluidly connectable to an existing fuel tank for retrofitting thereof.

17. The inerting system according to claim 1, wherein the shared ullage supply passage and liquid fuel return passage further includes a valve configured to control flow through the shared ullage supply passage and liquid fuel return passage.

* * * * *